United States Patent
Aksu et al.

(10) Patent No.: US 12,402,067 B2
(45) Date of Patent: Aug. 26, 2025

(54) METHOD AND SYSTEM FOR ADMISSION AND CAPACITY CONTROL FOR INTEGRATED ACCESS AND BACKHAUL NETWORK

(71) Applicant: Verizon Patent and Licensing Inc., Basking Ridge, NJ (US)

(72) Inventors: Arda Aksu, Lafayette, CA (US); Vishwanath Ramamurthi, San Ramon, CA (US); Parvez Ahmad, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 453 days.

(21) Appl. No.: 17/933,157

(22) Filed: Sep. 19, 2022

(65) Prior Publication Data
US 2024/0098622 A1 Mar. 21, 2024

(51) Int. Cl.
*H04W 48/06* (2009.01)
*H04W 24/10* (2009.01)
*H04W 48/20* (2009.01)
*H04W 88/08* (2009.01)

(52) U.S. Cl.
CPC ........... *H04W 48/06* (2013.01); *H04W 24/10* (2013.01); *H04W 48/20* (2013.01); *H04W 88/08* (2013.01)

(58) Field of Classification Search
CPC ..... H04W 48/06; H04W 24/10; H04W 48/20; H04W 88/08; H04W 88/085
See application file for complete search history.

(56) References Cited

U.S. PATENT DOCUMENTS

| | | | |
|---|---|---|---|
| 2008/0090575 A1* | 4/2008 | Barak | H04W 28/18 370/310 |
| 2013/0310052 A1* | 11/2013 | Timus | H04W 72/29 455/445 |
| 2017/0006499 A1* | 1/2017 | Hampel | H04L 41/0668 |
| 2020/0029384 A1* | 1/2020 | Hong | H04W 36/305 |
| 2021/0168743 A1* | 6/2021 | Sheng | H04L 1/1614 |
| 2021/0195675 A1* | 6/2021 | Park | H04W 88/14 |
| 2021/0314838 A1* | 10/2021 | Sheng | H04W 48/16 |
| 2021/0367888 A1* | 11/2021 | Ramamurthi | H04L 47/12 |
| 2022/0053406 A1* | 2/2022 | Lee | H04W 40/22 |
| 2024/0056963 A1* | 2/2024 | Kinoshita | H04W 40/24 |
| 2024/0196305 A1* | 6/2024 | Churei | H04W 16/26 |
| 2025/0016651 A1* | 1/2025 | Horio | H04W 40/22 |

* cited by examiner

*Primary Examiner* — Afshawn M Towfighi

(57) ABSTRACT

A method, a device, and a non-transitory storage medium are described in which an integrated access and backhaul service is provided. The integrated access and backhaul service may include an admission control service that manages admission control based on access and backhaul capacities of an integrated access and backhaul network such that access and backhaul capacities at any integrated access and backhaul device are not exceeded. The integrated access and backhaul service may include a capacity allocation service. The capacity allocation service may provision scheduling and resource allocation to support a performance metric and/or other criteria at an integrated access and backhaul device based on access and backhaul demands and capacities.

20 Claims, 8 Drawing Sheets

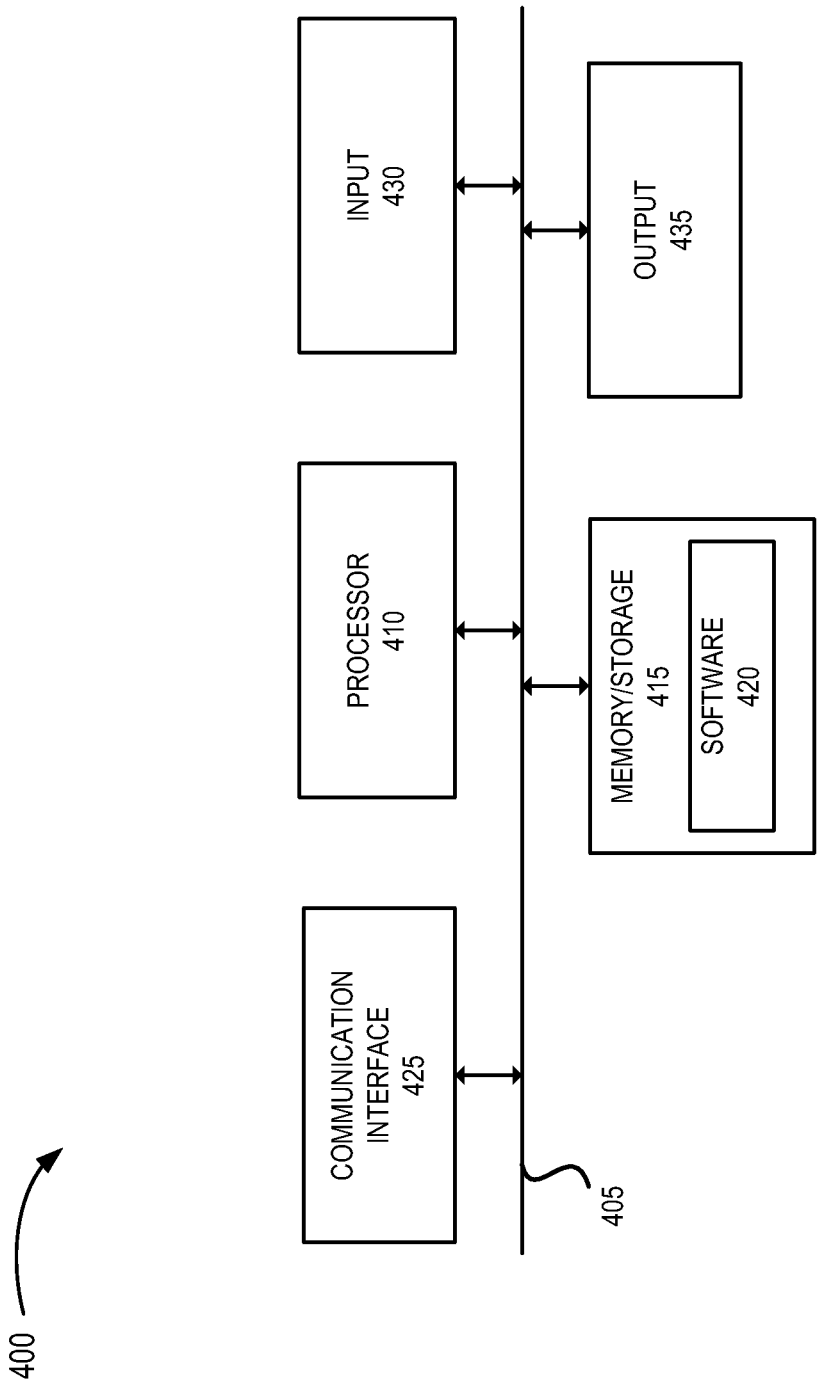

METHOD AND SYSTEM FOR ADMISSION AND CAPACITY CONTROL FOR INTEGRATED ACCESS AND BACKHAUL NETWORK

BACKGROUND

Development and design of networks present certain challenges from a network-side perspective and an end device perspective. For example, Next Generation (NG) wireless networks, such as Fifth Generation New Radio (5G NR) networks are being deployed and under development. A radio access network (RAN) may include Integrated Access and Backhaul nodes that may provide backhaul and access support.

BRIEF DESCRIPTION OF THE DRAWINGS

FIG. 4 is a diagram illustrating exemplary components of a device that may correspond to one or more of the devices illustrated and described herein;

DETAILED DESCRIPTION

Figure 1:
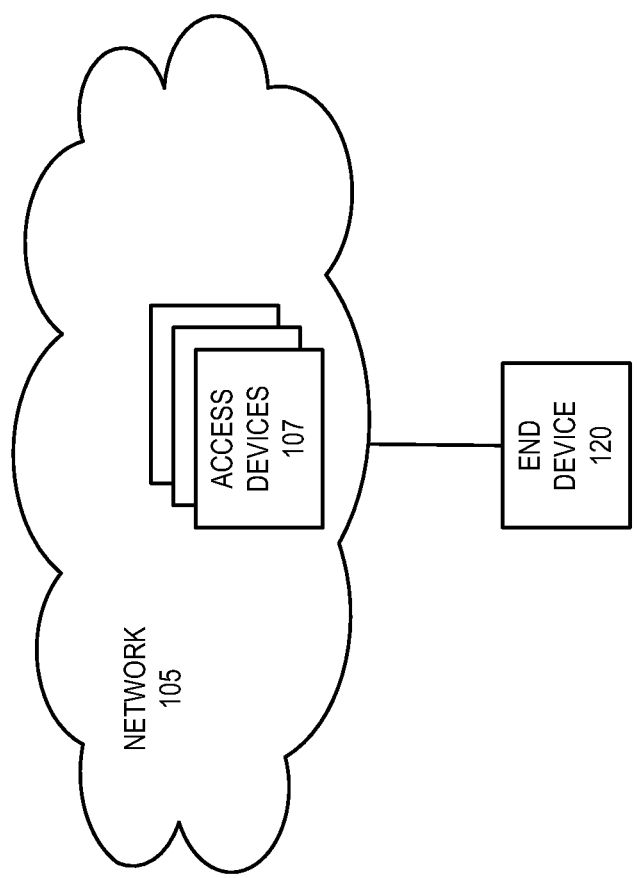
FIG. 1 is a diagram illustrating an exemplary environment in which an exemplary embodiment of an integrated access and backhaul service may be implemented.

The following detailed description refers to the accompanying drawings. The same reference numbers in different drawings may identify the same or similar elements. Also, the following detailed description does not limit the invention.

IAB devices, nodes, and/or cells (also known as relay devices or nodes) may enable operators to dynamically use part of the wireless spectrum for backhaul purposes, thus eliminating the need for costly fiber backhaul, for example. In a typical deployment, multiple child IAB devices may be connected to a parent device, such as an IAB donor device or node. One issue with such a topology is that the amount of spectrum needed for backhaul varies with the number of child IAB devices and end devices/users, and the amount of spectrum remaining for access will also vary. As a consequence, users may experience uneven wireless service depending on the IAB device to which a user is connected. For example, an IAB device closer to the parent device (e.g., in a hierarchical tree structured topology) may need to support the backhaul for other IAB devices more remote from the parent device. In this regard, the user/end device closer to the parent device may be subject to lower bandwidth and/or throughput relative to another user/end device more remote from the parent device.

Additionally, different capacity allocation (e.g., scheduling) schemes may result in different kinds of uneven user experience across an IAB network. As an example, the allocation of backhaul capacity at each IAB device before allocating access capacity may yield uneven user experience across the IAB network According to another example, proportional-fair scheduling to all links at an IAB device, without differentiating whether the link is for backhaul or access may also yield an uneven user experience. Further, user admission control is a contributing factor as to whether or not even user experience is provided in the IAB network.

According to exemplary embodiments, an integrated access and backhaul service is described. According to an exemplary embodiment, the integrated access and backhaul service may include a user admission control service. The user admission control service may determine whether or not to add a new user/end device to a IAB device, node, and/or cell (referred to simply as an IAB device). The user admission control service may be implemented in an IAB network or portion thereof (e.g., a cluster, a geographic area of the IAB network, etc.).

According to an exemplary embodiment, the user admission control service may be implemented by a device for which (all) wirelessly backhauled IAB devices may be accounted. According to an exemplary embodiment, the user admission control service may obtain current state information pertaining to each IAB device, as described herein. For example, the current state information may include each IAB device and its associated backhaul and access capacities. According to an exemplary embodiment, when a current cell capacity value of an IAB device to which a user/end device wishes to connect satisfies a threshold capacity value, the connection request may be sent to an IAB donor device. Otherwise, the connection request may be rejected. According to an exemplary embodiment, the user admission control service logic of the IAB donor device may analyze the current state information for each IAB device upstream from the source IAB device along a network path to the IAB donor device, determine each upstream IAB device available capacity, and apply the threshold capacity value, as described herein. According to an exemplary embodiment, the user admission control service logic of the IAB donor device may determine whether the connection request is rejected or accepted.

According to an exemplary embodiment, the user admission control service may use a measurement report, which is provided by the user/end device, relating to multiple candidate IAB devices to which the user/end device may connect. The user admission control service logic of the IAB donor device may use the measurement report information to determine if the user/end device may be better served by a different IAB device in view of the user admission control service logic and backhaul and access capacities, as described herein. When such a determination is made, a connection reject message, which may include a redirect message indicating the different IAB device, may be transmitted to the user/end device.

According to an exemplary embodiment, the integrated access and backhaul service may include a capacity allocation service. According to an exemplary embodiment, the capacity allocation service may calculate a minimum performance metric (e.g., throughput and/or another performance metric) to each user of the IAB network based on access and backhaul demands, as described herein. According to an exemplary embodiment, the capacity allocation service may perform scheduling to achieve the minimum performance metric based on the backhaul and access capacity requirements. According to another exemplary embodiment, the capacity allocation service may calculate a capacity allocation to support other types of criteria, such as maximizing the minimum number of users per IAB device, as described herein.

In view of the foregoing, the integrated access and backhaul service may provide admission control for each and any IAB device in an IAB network in light of existing users' performance. The admission control service may be implemented in conjunction with other admission control procedures such that capacity in any of the IAB devices within the IAB network may not be exceeded given the addition of a new user to any IAB device of the IAB network. Additionally, the capacity allocation service may enable the scheduling of resources of an IAB device and an IAB network such that a minimum performance metric for users and access and backhaul connections are evenly and fairly distributed. Unlike traditional networks in which a user's experience is only influenced by other users attached to a particular sector and not by users attached to other wireless stations in the network, the integrated access and backhaul service may address these issues across an IAB network or cluster of IAB devices.

FIG. 1 is a diagram illustrating an exemplary environment 100 in which an exemplary embodiment of the integrated access and backhaul service may be implemented. As illustrated, environment 100 includes a network 105 that includes access devices 107. Environment 100 also includes an end device 120.

According to other embodiments, environment 100 may include additional devices and/or different types of devices than those illustrated and described herein. According to other exemplary embodiments, environment 100 may include additional networks and/or different networks than those illustrated and described herein.

Environment 100 includes communication links between access devices 107, and between end device 120 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Network 105 includes one or multiple networks of one or multiple types and technologies. For example, network 105 may include a RAN. For example, the RAN may be implemented to include a 5G RAN, a future generation RAN (e.g., a Sixth Generation (6G) RAN, a Seventh Generation (7G) RAN, or a subsequent generation RAN), a centralized-RAN (C-RAN), an Open Radio Access Network (O-RAN), and/or another type of radio access network. The RAN may include a legacy RAN (e.g., a Third Generation (3G) RAN, a Fourth Generation (4G), a 4.5 RAN, etc.). Network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to network 105. According to an exemplary embodiment, network 105 may include an IAB network.

Network 105 may include other types of networks, such as a core network, an external network, a service or an application-layer network, the Internet, the World Wide Web (WWW), an Internet Protocol Multimedia Subsystem (IMS) network, a cloud network, a packet-switched network, a data center, a service provider network, a mobile or multi-access edge computing (MEC) network, a fog network, an Ethernet network, a public network, a private network, or another type of network.

Depending on the implementation, network 105 may include one or multiple types of network devices, such as access devices 107. For example, access device 107 may include a next generation Node B (gNB), an evolved Long Term Evolution (eLTE), an evolved Node B (eNB), a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), a wireless relay device, an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, and/or a future generation wireless access device (e.g., a 6G wireless station, a 7G wireless station, or another generation of wireless station).

According to an exemplary embodiment, access device 107 may include IAB devices. An IAB device, an IAB node, or an IAB cell (referred to simply as an IAB device) may provide a point-of-attachment to end device 120. For example, an access function (for end device 120) and a backhaul function of the IAB device may be integrated into its wireless communication capabilities. An access link of the IAB device may be either in-band (i.e., in the same frequency band as the backhaul link) or out-of-band (i.e., in a different frequency band as the backhaul link). The IAB device may have its own cell identifier, and may be operable to perform radio resource management (RRM), hybrid automatic repeat requests (HARQs), and other types of air interface operations (e.g., reference signaling, sync signaling, scheduling, handovers, etc.).

Access device 107 may include other types of wireless nodes (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), tow dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

End device 120 includes a device that may have communication capabilities (e.g., wireless, wired, optical, etc.). End device 120 may or may not have computational capabilities. End device 130 may be implemented as a mobile device, a portable device, a stationary device (e.g., a non-mobile device and/or a non-portable device), a device operated by a user, or a device not operated by a user. For example, end device 120 may be implemented as a smartphone, a mobile phone, a personal digital assistant, a tablet, a netbook, a phablet, a wearable device (e.g., a watch, glasses, etc.), a computer, a gaming device, a music device, an Internet of Thing (IoT) device, a drone, a smart device, a fixed wireless device, a router, a sensor, an automated guided vehicle (AGV), a vehicular telematics unit, an industrial robot, or other type of wireless device (e.g., other type of user equipment (UE)). End device 120 may be configured to execute various types of software (e.g., applications, programs, etc.). The number and the types of software may vary among end devices 130. End device 120 may include "edge-aware" and/or "edge-unaware" application service clients. For purposes of description, end device 120 is not considered a network device.

Figure 2:
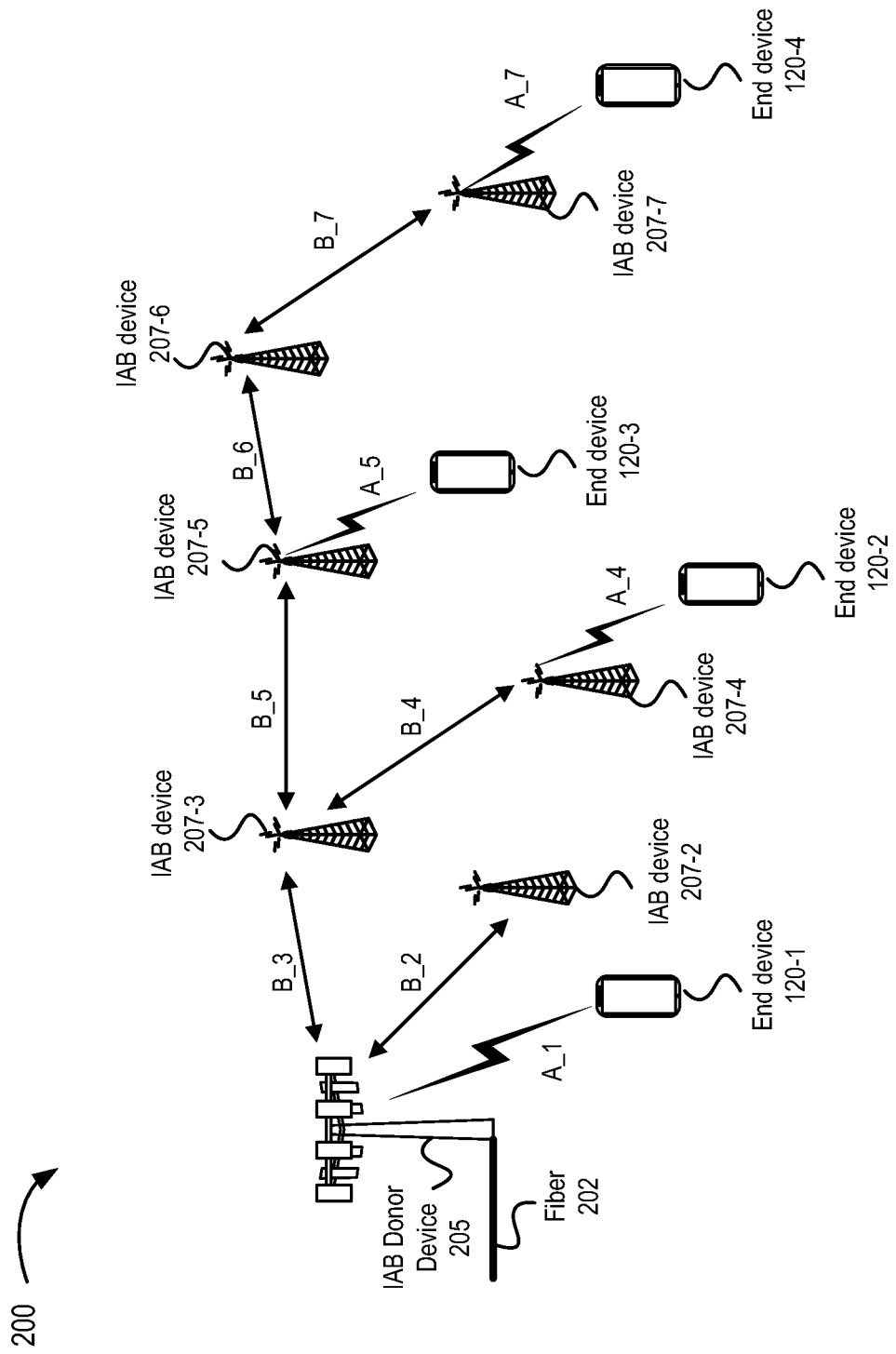
FIG. 2 is diagram illustrating another exemplary environment in which an exemplary embodiment of the integrated access and backhaul service may be implemented.

FIG. 2 is a diagram illustrating another exemplary environment 200 in which an exemplary embodiment of the integrated access and backhaul service may be implemented. As illustrated, environment 200 may include an IAB donor device 205, IAB devices 207-2 through 207-7 (also referred to collectively as IAB devices 207, and generally or individually as TAB device 207), and end devices 120-1 through 120-4 (also referred to collectively as end devices 120, and generally or individually as end device 120). For purposes of illustration and description, environment 200 may include backhaul links (e.g., depicted as B_2 through B_7) and access links (e.g., depicted as A_1, A_4, A_5, and A_7). According to an exemplary implementation, IAB donor device 205 may be communicatively coupled to an optical fiber 202. Although not illustrated, the optical fiber 202 may connect to a provider network (e.g., a core network, etc.) and/or another type of networks (e.g., an application layer network, such as a MEC network, a cloud network, the Internet, or the like).

According to various exemplary embodiments, IAB donor device 205 and IAB devices 207 may or may not be a same type of access device 107. For example, IAB donor device 205 and IAB devices 207 may be implemented as gNBs or eNBs. According to another example, IAB donor device 205 may be implemented as an eNB or a gNB and IAB devices 207 may be implemented as wireless relay devices. Additionally, for example, IAB devices 207 may or may not be a same type of access device 107, as described herein.

The number and arrangement of devices and communication links (e.g., backhaul, access, fiber 202) illustrated in FIG. 2 are exemplary. The type of communication links (e.g., wireless, fiber, etc.) are also exemplary.

Figure 3A:
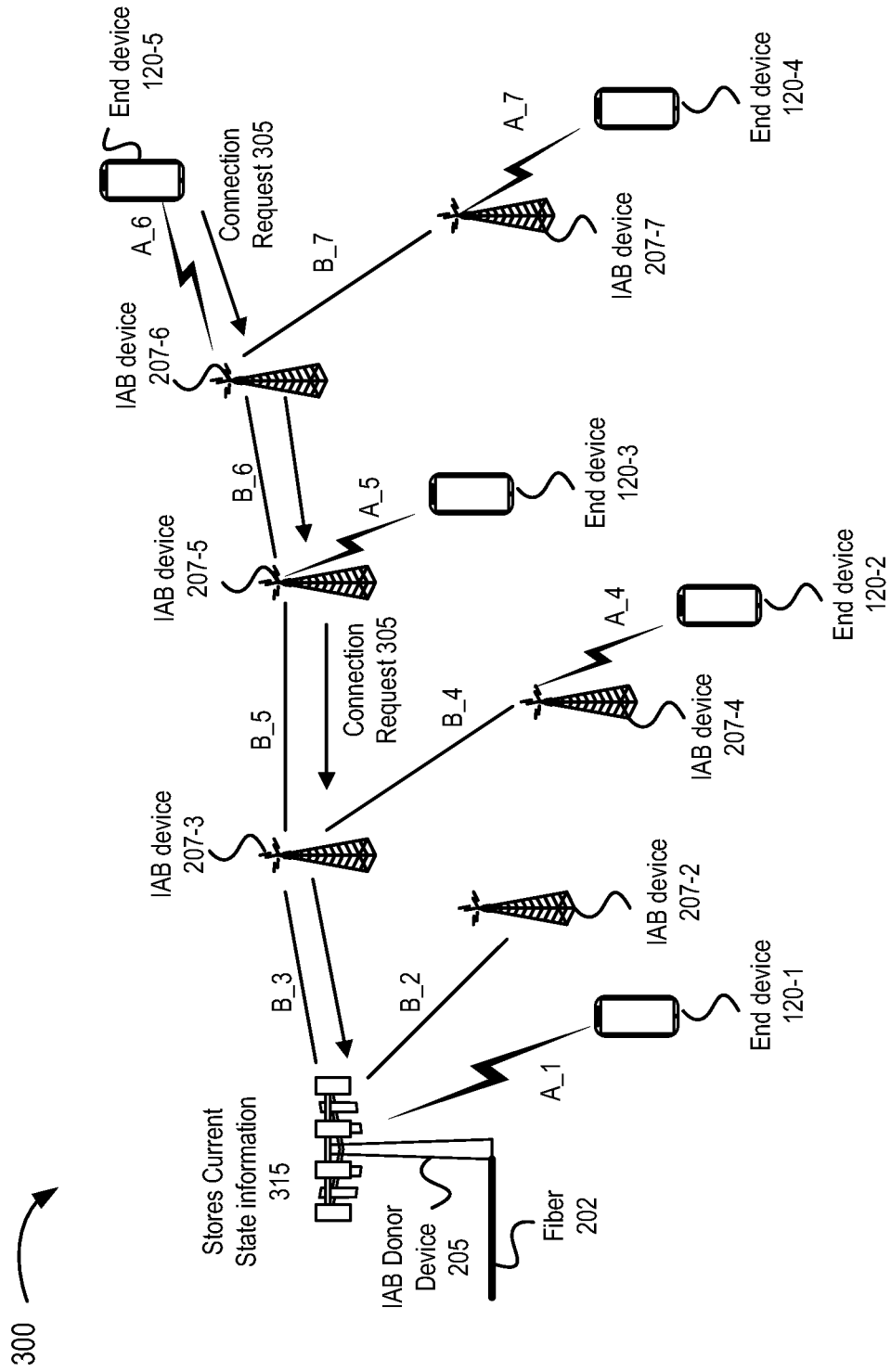
FIGS. 3A-3C are diagrams illustrating an exemplary process of an exemplary embodiment of the integrated access and backhaul service.
Figure 3B:
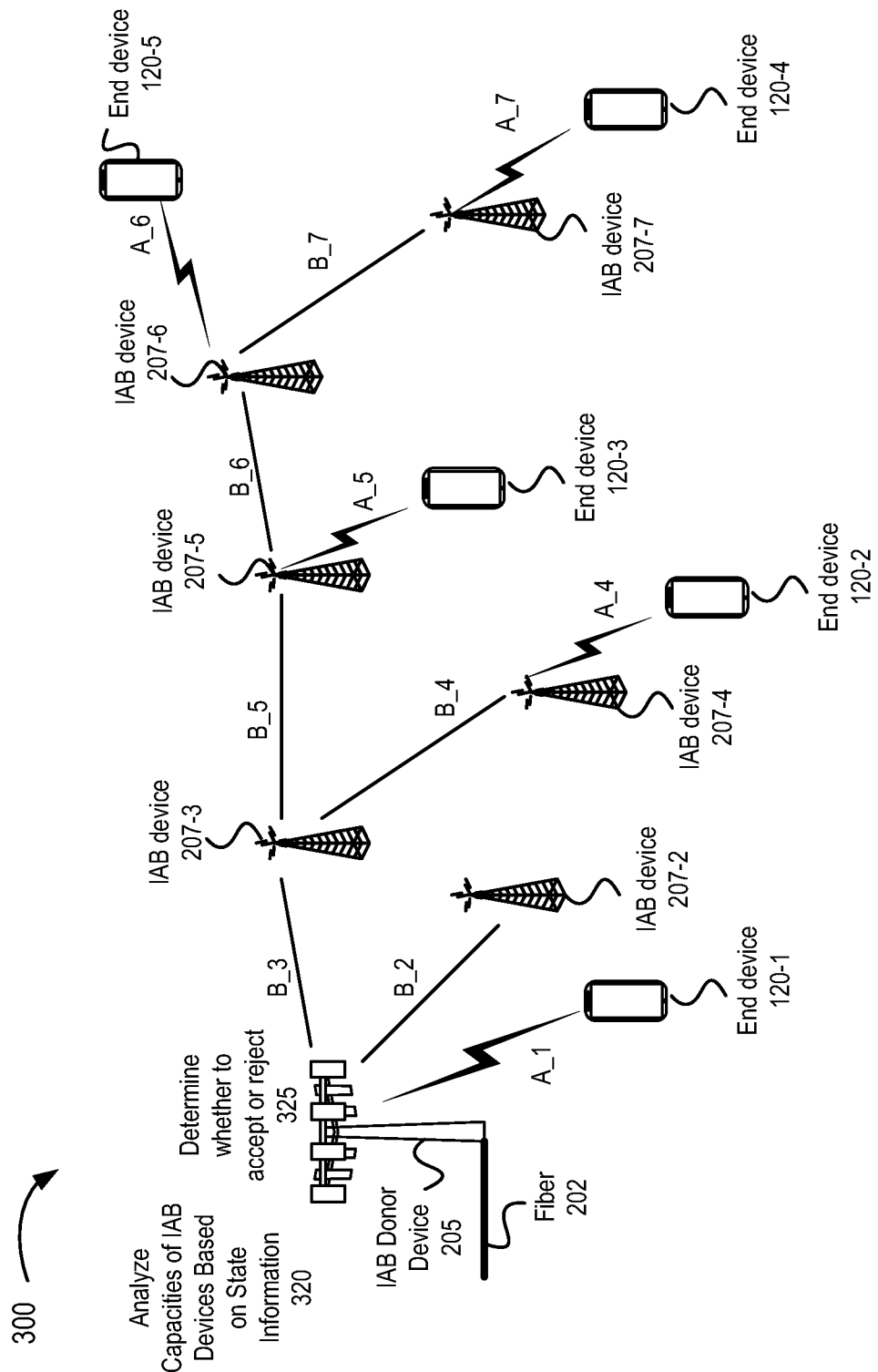
Figure 3C:
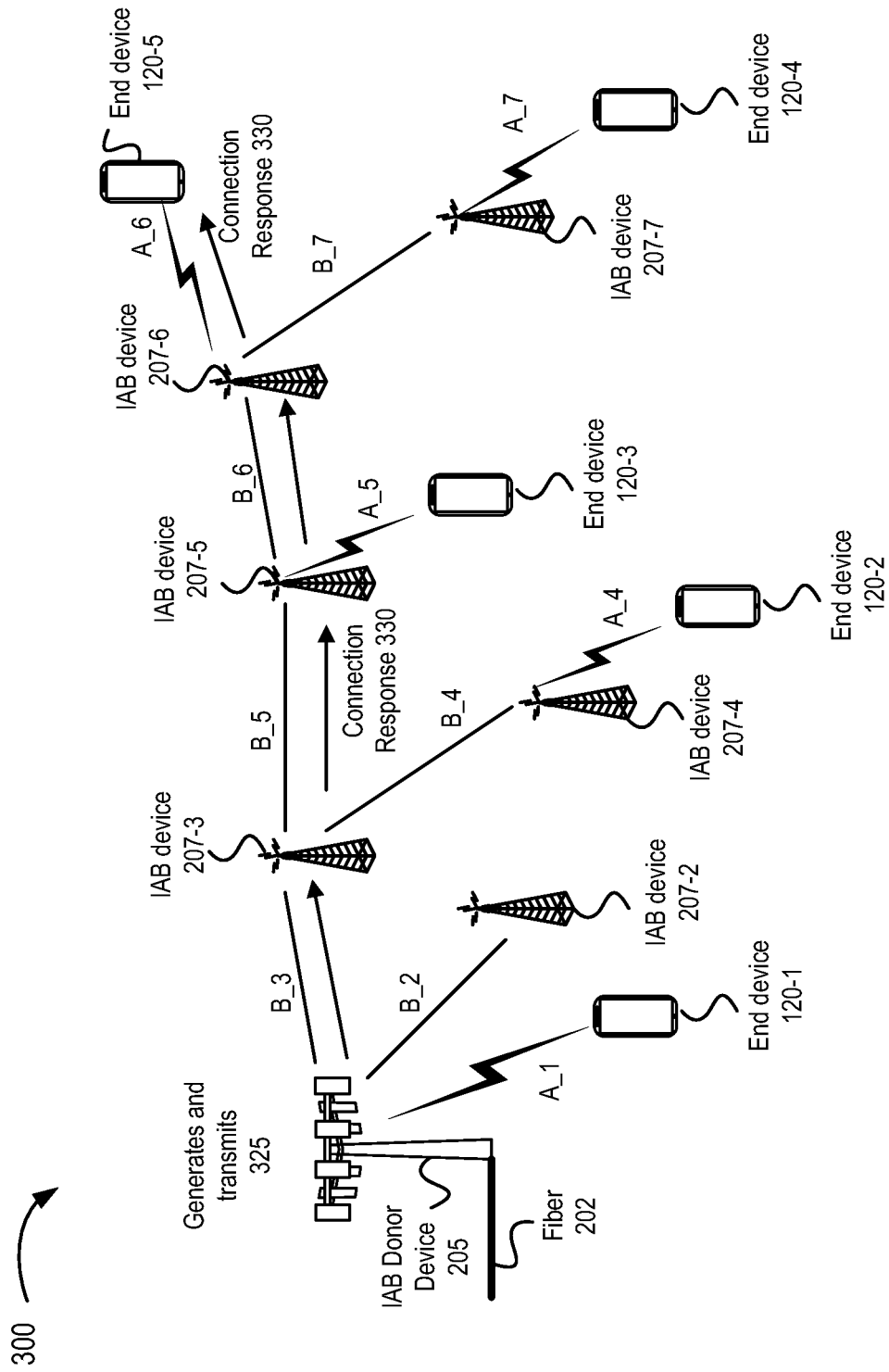

FIG. 3A-3C are diagrams illustrating an exemplary process 300 of an exemplary embodiment of the user admission control service. Referring to FIG. 3A, assume end device 120-5 wishes to connect to IAB device 207-6. For example, end device 120-5 may generate and transmit a connection request 305 to IAB device 207-6.

According to an exemplary embodiment, IAB device 207-6 may compare a capacity value of IAB device 207-6 to a capacity threshold value. Based on a result of the comparison, IAB device 207-6 may determine whether to reject the connection request or send the connection request to parent device 205. According to this exemplary scenario, assume that the capacity threshold value is satisfied, and IAB device 207-6 relays connection request 305 to IAB donor device 205.

According to an exemplary embodiment, assume that IAB donor device 205 stores current state information 315 pertaining to IAB devices 207. For example, the current state information may include access spectrum usage and backhaul spectrum usage. Although not illustrated, IAB devices 207 may report their current state information to IAB donor device 205, such as periodically and/or non-periodically (e.g., based on a triggering event, etc.). The current state information may further include static information, such as topology information (e.g., backhaul links, access links, connection between IAB devices 207, backhaul and access link capacities, etc.). As an example, referring to FIG. 2, the topology information may include the following:

IAB donor device 205 (B3, B2); A1
IAB device 207-2 ( ); A2
IAB device 207-3 (B5, B4); A3
IAB device 207-4 ( ); A4
IAB device 207-5 (B6); A5
IAB device 207-6 (B7); A6
IAB device 207-7 ( ); A7, in which backhaul link(s) and access link(s) are associated with each IAB device 207. Referring to FIG. 3B, IAB donor device 205 may analyze capacities of IAB devices 207 based on the state information 320. According to this example, there is a single network path between IAB device 207-6 and IAB donor device 205. However, according to other examples, there may be multiple network paths available. According to such circumstances, although not illustrated, IAB donor device 205 may select a network path among multiple candidate network paths based on various criteria, as described further below. IAB donor device 205 may iteratively select IAB devices 207 of a network path between IAB device 207-6 to IAB donor device 205. For example, IAB donor device 207 may select IAB 207-5 to analyze capacities relative to a capacity threshold value. Based on a result of the analysis, IAB donor device 205 may determine whether to accept or reject 325 the connection request. For example, if IAB donor device 205 determines that the capacity of IAB device 207-6 does not satisfy the capacity threshold value, IAB device 207-6 may determine to reject the connection request. However, if the capacity threshold value is satisfied, IAB donor device 205 may select another upstream IAB device 207-3, analyze the capacity, and determine whether to accept or reject the connection request. According to this example, assume IAB device 207-3 satisfies the capacity threshold value, IAB donor device 205 may analyze its own capacity and determine whether or not to accept or reject the connection request.

Referring to FIG. 3C, assume that capacities along the network path are satisfied. In response, IAB donor device 205 may generate and transmit 325 a connection response to IAB device 207-6. For example, a connection response 330 may include data indicating to accept the connection request of end device 120-5/user.

Although FIGS. 3A-3C illustrate an exemplary embodiment of process 300, according to other exemplary embodiments, process 300 may include additional, different, and/or fewer operations. For example, as previously described, according to an exemplary embodiment of the user admission control service, end device 120 may transmit a measurement report pertaining to multiple IAB devices 207. For example, the measurement report may include a reference signal received power (RSRP) value, a reference signal received quality (RSRQ) value, a received signal strength indicator (RSSI) value, a signal-to-interference-plus-noise ratio (SINR) value, and/or the like.

As a part of the capacity analysis by a source or child IAB device 207 (e.g., IAB device 207-6) or a destination or parent IAB device (e.g., IAB donor device 205), as described herein, IAB device 207-6 or IAB donor device 205 may analyze the measurement report in conjunction with backhaul and access capacities. IAB donor device 205 or IAB device 207-6 may determine whether another IAB device 207 (e.g., other than IAB device 207-6) may provide wireless access to end device 120. For example, in cases where the measurement report indicates multiple viable candidate IAB devices 207 to which end device 120 may connect but another IAB device 207 may satisfy one or multiple network-side criteria (e.g., load-balancing, residual capacity values, and other factors, associated with a network path and/or an IAB device), as described herein, IAB donor device 205 may select another IAB device to provide wireless access to end device 120. Based on such a determination, IAB device 207-6 or IAB donor device 205 may generate and transmit a connection reject message, which includes a redirect message, to end device 120. For example, the redirect message may indicate another IAB device 207 (e.g., other than IAB device 207-6, such as IAB device 207-7) from which end device 120 may seek a radio connection.

As previously described, according to an exemplary embodiment, the integrated access and backhaul service may include a capacity allocation service. According to an exemplary embodiment, the capacity allocation service may calculate a minimum performance metric (e.g., throughput and/or another performance metric) to each user of the IAB network based on access and backhaul demands, as described herein. For example, a consideration in the division of capacity between access and backhaul at each IAB device may include other criteria, such as network topology, user demand, and RF capacity limitations at each IAB device with an aim of guaranteeing a certain service level (e.g., quality of service (QoS), key performance indicator (KPI), quality of experience (QoE), mean opinion score (MOS), service level agreement (SLA) and/or another performance metric (e.g., throughput, latency, packet error rate, packet drop rate, reliability, bit rates (e.g., guaranteed, maximum, minimum, average, etc.), jitter, traffic class, round trip time (RTT), and/or the like).

Consider that the number of users at IAB device k is $N_k$ and that the throughput demand from each user i is $T_i$. Then the total access demand at IAB device k is given by:

$$A_k = \sum_{i=1}^{N_k} T_i. \tag{1}$$

According to one example, assume a criterion to guarantee a certain throughput $T_{min}$ to each user in the IAB network. In this case, according to an exemplary expression, the access demand at IAB node k may be expressed as:

$$A_k = T_{min} N_k. \tag{2}$$

The backhaul capacity requirements at an IAB device may be determined by the sum of the backhaul requirements for all its children IAB devices and the access demands for the users directly connected to the IAB device. For example, consider IAB node k has $M_k$ children IAB devices, with child IAB device j having a backhaul requirement of $B_j$. Then the backhaul requirement for IAB device k may be expressed according to the exemplary expression:

$$B_k = \sum_{j=1}^{M_k} B_j + A_k = \sum_{j=1}^{M_k} B_j + T_{min} N_k. \tag{3}$$

To ensure good performance under congestion, the backhaul demand at any IAB device should be less than the capacity available at the IAB device, which may be expressed according to the exemplary expression:

$$B_k \leq \eta C_k \tag{4},$$

where $\eta < 1$ is an optimization parameter that may consider congestion as well as radio frequency (RF) impairments ($C_k$). In a scenario where the IAB device topology and the user distribution $N_k$ across the network is known (e.g., the number of users at each IAB device is given), then an exemplary backhaul capacity optimization could be to maximize the minimum speed for each user i.e., maximize $T_{min}$. In this regard, an overall optimization problem may be expressed as:

Maximize $T_{min}$     (5)

subject to:

$$B_k = \sum_{j=1}^{M_k} B_j + T_{min} N_k \tag{6}$$

$$B_k \leq \eta C_k. \tag{7}$$

This formulation may be solved as a linear optimization problem, for example, using traditional linear programming (e.g., optimization models, algorithms, etc.) and/or operational research techniques. In response to an overall capacity allocation being calculated, the capacity allocation service may perform scheduling for IAB devices of an IAB network to achieve the minimum performance metric (e.g., throughput) based on the backhaul and access capacity requirements and radio conditions of the users/end devices 120.

As stated herein, expressions (1)-(7) may relate to a calculation pertaining to a minimum throughput. However, according to other examples, other types of service level criteria may be applied to access and backhaul capacity allocations, as described herein. Additionally, for example, the capacity allocation service may calculate a capacity allocation to support other types of criteria, such as maximizing the minimum number of users per IAB device.

For example, consider a criterion to maximize the minimum number of users that can be served at each node given a certain minimum user throughput requirement $T_{min}$:

$$\text{Max Min } N_k \tag{8}$$

subject to:

$$B_k = \sum_{j=1}^{M_k} B_j + T_{min} N_k \tag{9}$$

$$B_k \leq \eta C_k. \tag{10}$$

Similarly, this formulation may be solved as a linear optimization problem, for example, using traditional linear programming (e.g., optimization models, algorithms, etc.) and/or operational research techniques. In response to an overall capacity allocation being calculated, the capacity allocation service may perform scheduling to achieve the minimum performance metric (e.g., throughput) based on the backhaul and access capacity requirements while maximizing the minimum number of users that can be served at each IAB device. As an example, a modified proportional and fair (PF) algorithm may be applied using the minimum rate requirements of the access and backhaul links in addition to the radio conditions of the users, maximization of the minimum number of users, and optionally other types of criteria or requirements, as described herein.

FIG. 4 is a diagram illustrating exemplary components of a device 400 that may be included in one or more of the devices described herein. For example, device 400 may correspond to components included in access devices 107, end device 120, IAB donor device 205, IAB device 207, and/or other types of devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may also be implemented as a multiprocessor system.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to access device 107 or IAB donor device 205, software 420 may include an application that, when executed by processor 410, provides a function of the integrated access and backhaul service, as described herein. As an example, with reference to IAB device 207, software 420 may include an application that, when executed by processor 410, provides a function of the integrated access and backhaul service, as described herein. Software 420 may also include firmware, middleware, microcode, hardware description language (HDL), and/or other form of instruction. Software 420 may further include an operating system (OS) (e.g., Windows, Linux, OpenStack, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna, a communication port, and/or a buffer. Communication interface 425 may include various processing logic or circuitry (e.g., multiplexing/de-multiplexing, filtering, amplifying, converting, error correction, application programming interface (API), etc.). Communication interface 425 may be implemented as a reference point interface, a service-based interface, an Open Radio Access Network (O-RAN) interface, a Fifth Generation (5G) interface, another generation of interface (e.g., 5.5G interface, a 6G interface, a 7G interface, etc.), or some other type of interface (e.g., a MEC server interface associated with a MEC network, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As described herein, device 400 may be implemented as a virtualized device. For example, device 400 may be instantiated, created, deleted, or some other operational state during its life-cycle (e.g., refreshed, paused, suspended, rebooting, or another type of state or status), using well-known virtualization technologies. For example, device 400 may be implemented as access device 107, such as a network device of a RAN, a network device of a core network, a network device of an application layer network, and/or another type of network device or end device 120 that may be a virtualized device and may include logic of the integrated access and backhaul service, as described herein.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a function or operation described herein based on the execution of hardware (processor 410, etc.).

Figure 5:
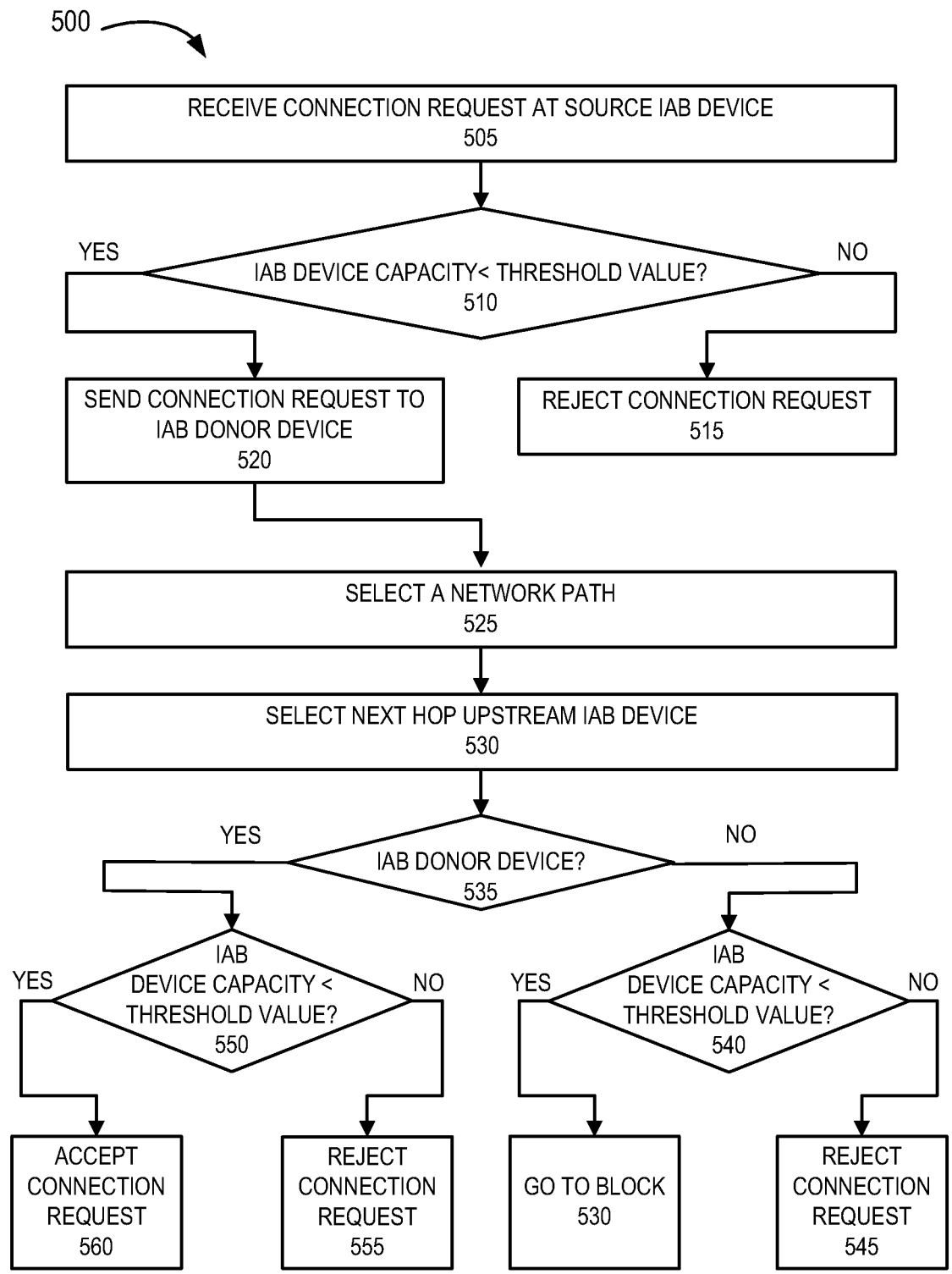
FIG. 5 is a flow diagram illustrating an exemplary process of an exemplary embodiment of the integrated access and backhaul service.

FIG. 5 is a flow diagram illustrating an exemplary process 500 of an exemplary embodiment of the integrated access and backhaul service. According to an exemplary embodiment, access device 107 may perform steps of process 500. For example, IAB donor device 205 may perform at least some steps of process 500. According to an exemplary embodiment, IAB donor device 205 may include a server component. The server component may include logic of the integrated access and backhaul service, which may include the user admission control service, as described herein. According to other exemplary embodiments, a server device may be co-located with access device 107 or part of an external network (e.g., a MEC network). According to yet other exemplary embodiments, IAB donor device 205 and an external device may collaboratively perform one or multiple steps of process 500. According to some exemplary embodiments, processor 410 of access device 107 may execute software 420 to perform steps illustrated in FIG. 5, and described herein.

Referring to FIG. 5, in block 505, a source IAB device may receive a connection request. For example, IAB device 207 may receive a connection request from end device 120. By way of further example, the connection request may be a radio resource control (RRC) connection request.

In block 510, the source IAB device may determine whether a capacity threshold value is satisfied. For example, IAB device 207 may compare a current capacity value to the threshold capacity value. According to some exemplary embodiments, the threshold capacity value may pertain to both backhaul and access capacities. According to other exemplary embodiments, the threshold capacity value may include separate values for backhaul and access thresholds. According to some exemplary embodiments, the threshold capacity value may indicate a minimum capacity. According to some exemplary embodiments, the capacity threshold value may be the same value or a different value among IAB devices 207.

Based on a result of the comparison, when the source IAB device determines that the capacity threshold is not satisfied (block 510—NO), the source IAB device may reject the connection request (block 515). For example, IAB device 207 may generate and transmit the connection reject message to end device 120. When the source IAB device determines that the capacity threshold is satisfied (block 510—YES), the source IAB device may transmit (e.g., relay) the connection request to a donor device (block 520). For example, IAB device 207 may transmit the connection request to IAB donor device 205.

In block 525, the donor device may select a network path. For example, IAB donor device 205 may select from one or multiple candidate paths between the IAB device 207 and IAB donor device 205 based on one or multiple criteria, network topology, and/or current state information. According to various exemplary embodiments, the criteria may pertain to load balancing criteria (e.g., least number of connections, etc.), residual or available capacities (e.g., access, backhaul, etc.) on a per IAB device basis associated with a network path and/or on a per network path basis, an establishment cause value associated with the connection request, an access control class (ACC) associated with the user and/or end device 120, congestion information, current performance metric information pertaining to an IAB device and/or network path, and/or another type of configurable criteria.

In block 530, the donor device may select a next hop upstream IAB device. For example, IAB donor device 205 may select a next hop IAB device 207 that is upstream from the source IAB device and along the selected network path. In block 535, the donor device may determine whether the selected next hop upstream IAB device is the donor device. For example, IAB donor device 205 may determine whether it is the next hop IAB device. When the donor device determines that it is not the donor device (block 535—NO), the donor device may compare the capacity of the next hop IAB device to a threshold capacity value (block 540). For example, the comparison procedure may be similar to that explained in relation to block 510. According to various exemplary embodiments, the threshold capacity value may be the same or different among one or multiple IAB devices 207 and/or IAB donor device 205. Based on a result of the comparison, the connection request may be rejected (block 545) when the capacity threshold value is not satisfied (block 540—NO) or when the capacity threshold value is satisfied (block 540—YES), return to block 530 and select the next upstream IAB device along the network path towards IAB donor device 205.

When the donor device determines that it is the next hop device (block 535—YES), the donor device may compare the current capacity value to a threshold capacity value (block 550). Based on a result of the comparison, when the threshold capacity value is not satisfied (block 550—NO), the connection request may be rejected (block 555). When the threshold capacity value is satisfied (block 550—YES), the connection request may be accepted (block 560).

For blocks 545 and 555, when the connection request is rejected, the donor device may generate and transmit a connection reject message back to the source device. The source device may relay the connection reject message to end device 120, for example. However, when the connection request is accepted in block 560, the donor device may generate and transmit the connection accept message to the source device. The source device may relay the connection accept message to end device 120, for example.

Although FIG. 5 illustrates an exemplary process 500 of the integrated access and backhaul service, according to other embodiments, process 500 may include additional operations, fewer operations, and/or different operations than those illustrated in FIG. 5, and described herein. For example, as described herein, according to some exemplary embodiments, the donor device may obtain measurement report information from end device 120. The donor device may select a different access device 107 to which end device 120 may connect based on the measurement report information and network-side criteria, as described herein. According to exemplary embodiment, when such a determination is made, the donor device may include a redirect message with the connection reject message. The redirect message may indicate another source IAB device to which end device 120 may connect.

Figure 6:
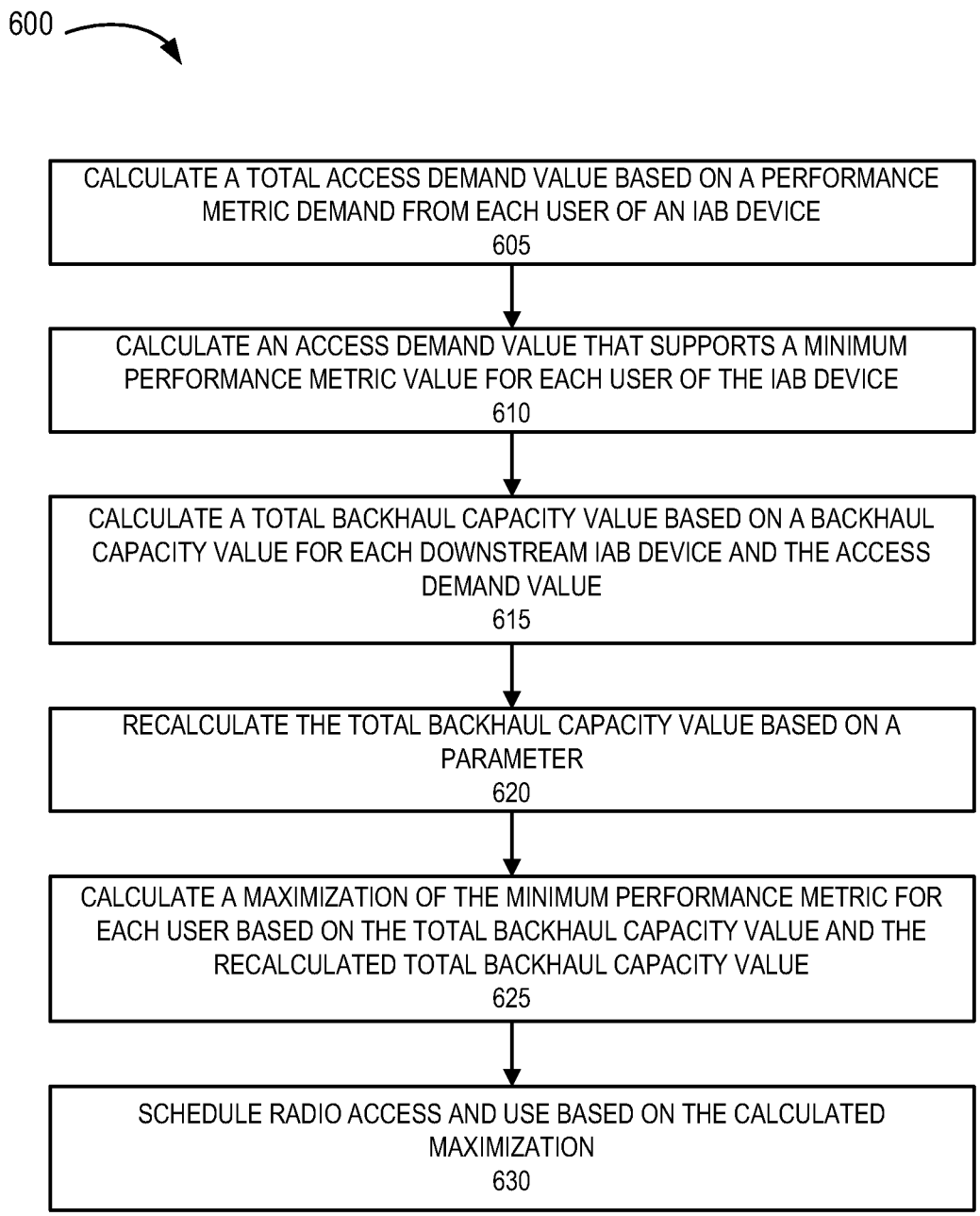
FIG. 6 is a flow diagram illustrating another exemplary process of an exemplary embodiment of the integrated access and backhaul service.

FIG. 6 is a flow diagram illustrating an exemplary process 600 of an exemplary embodiment of the integrated access and backhaul service. According to an exemplary embodiment, access device 107 may perform steps of process 600. For example, IAB donor device 205 may perform at least some steps of process 600. According to an exemplary embodiment, IAB donor device 205 may include a server component. The server component may include logic of the integrated access and backhaul service, which may include the capacity allocation service, as described herein. According to other exemplary embodiments, a server device may be co-located with access device 107 or part of an external network (e.g., a MEC network). According to yet other exemplary embodiments, IAB donor device 205 and an external device may collaboratively perform one or multiple steps of process 600. According to some exemplary embodiments, processor 410 of access device 107 may execute software 420 to perform steps illustrated in FIG. 6, and described herein.

Although process 600 is described in relation to exemplary expressions (e.g., 1-7) and throughput as a performance metric, according to other exemplary embodiments, one or multiple different performance metrics (e.g., bitrate, latency, error rate, KPI, etc.), as described herein, may be implemented.

In block 605, a donor device may calculate a total access demand value based on a performance metric demand from each user of an IAB device. For example, IAB donor device 205 may calculate the total access demand value based on expression (1).

In block 610, the donor device may calculate an access demand value that supports a minimum performance metric value for each user of the IAB device. For example, IAB donor device 205 may calculate the access demand value based on expression (2).

In block 615, the donor device may calculate a total backhaul capacity value at the IAB device based on a backhaul capacity value for each downstream IAB device and the access demand value for the users directly connected to the IAB device. For example, IAB donor device 205 may calculate the total backhaul capacity value based on expression (3).

In block 620, the donor device may recalculate the total backhaul capacity value based on a parameter. For example, IAB donor device 205 may recalculate the total backhaul capacity value based on expression (4). For example, the parameter may be an optimization parameter value that may consider congestion and/or other types of RF impairments (e.g., noise, interference, received power, etc.).

In block 625, the donor device may calculate a maximization of the minimum performance metric based on the total backhaul capacity value and the recalculated total capacity value. For example, IAB donor device 205 may calculate the maximization or optimization based on exemplary expressions (5-7).

In block 630, radio access and use may be scheduled based on the calculated maximization. For example, the donor device may provide the capacity allocation information, which may yield the calculated maximization, to an IAB device. The IAB device may use this information for scheduling radio access and use by end device(s) 120 that may be connected to the IAB device.

Although FIG. 6 illustrates an exemplary process 600 of the integrated access and backhaul service, according to other embodiments, process 600 may include additional operations, fewer operations, and/or different operations than those illustrated in FIG. 6, and described herein. For example, process 600 may calculate other types of maximizations relating to other types of criteria, as described herein, as set forth in exemplary expressions (8-10). Similarly, scheduling of radio access and use may be calculated and provided for end devices 120 by an IAB device.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method comprising:
    receiving, by a network device of an integrated access and backhaul (TAB) network, a connection request from a wireless station of the IAB network and originating from an end device;
    selecting, by the network device, a network path to the wireless station;
    determining, by the network device, whether access and backhaul capacities satisfy a threshold value for each wireless station that is upstream from the wireless station along the network path;
    accepting, by the network device, the connection request based on determining that each wireless station satisfies the access and backhaul capacities; and
    rejecting, by the network device, the connection request based on determining that each wireless station does not satisfy the access and backhaul capacities.

2. The method of claim 1, wherein the selecting is based on a residual capacity value relating to access and backhaul capacities.

3. The method of claim 1, further comprising:
    receiving, by the network device before receiving the connection request, current state information from each wireless station of the network path, wherein the current state information includes a value pertaining to access and backhaul capacities.

4. The method of claim 1, further comprising:
    receiving, by the network device, a measurement report from the end device via the wireless station; and
    determining, by the network device based on the measurement report, that the end device connects to another wireless station.

5. The method of claim 4, further comprising:
    transmitting, by the network device based on the rejecting, a connection reject message that includes a redirect message indicating the other wireless station, to the wireless station.

6. The method of claim 1, wherein the threshold value is a different value among wireless stations of the network path.

7. The method of claim 1, further comprising:
    transmitting, by the network device based on the accepting, a connection accept message to the wireless station.

8. The method of claim 1, wherein the network device is a donor device upstream from the wireless station.

9. A network device comprising:
    a processor configured to:
        receive a connection request from a wireless station of an integrated access and backhaul (IAB) network and originating from an end device, wherein the network device is of the IAB network;
        select a network path to the wireless station;
        determine whether access and backhaul capacities satisfy a threshold value for each wireless station that is upstream from the wireless station along the network path;
        accept the connection request based on determining that each wireless station satisfies the access and backhaul capacities; and
        reject the connection request based on determining that each wireless station does not satisfy the access and backhaul capacities.

10. The network device of claim 9, wherein when selecting, the processor is further configured to:
    select the network path based on a residual capacity value relating to access and backhaul capacities.

11. The network device of claim 9, wherein the processor is further configured to:
    receive, before receiving the connection request, current state information from each wireless station of the network path, wherein the current state information includes a value pertaining to access and backhaul capacities.

12. The network device of claim 9, wherein the processor is further configured to:
  receive a measurement report from the end device via the wireless station; and
  determine, based on the measurement report, that the end device connects to another wireless station.

13. The network device of claim 12, wherein the processor is further configured to:
  transmit, based on the rejecting, a connection reject message that includes a redirect message indicating the other wireless station, to the wireless station.

14. The network device of claim 9, wherein the threshold value is a different value among wireless stations of the network path.

15. The network device of claim 9, wherein the processor is further configured to:
  transmit, based on the accepting, a connection accept message to the wireless station.

16. The network device of claim 9, wherein the network device is a donor device upstream from the wireless station.

17. A non-transitory computer-readable storage medium storing instructions executable by a processor of a network device of an integrated access and backhaul (TAB) network, which when executed cause the network device to:
  receive a connection request from a wireless station of the IAB network and originating from an end device;
  select a network path to the wireless station;
  determine whether access and backhaul capacities satisfy a threshold value for each wireless station that is upstream from the wireless station along the network path;
  accept the connection request based on determining that each wireless station satisfies the access and backhaul capacities; and
  reject the connection request based on determining that each wireless station does not satisfy the access and backhaul capacities.

18. The non-transitory computer-readable storage medium of claim 17, wherein the threshold value is a different value among wireless stations of the network path.

19. The non-transitory computer-readable storage medium of claim 17, wherein the instruction to select further comprise instructions executable by the processor, which when executed cause the network device to:
  select the network path based on a residual capacity value relating to access and backhaul capacities.

20. The non-transitory computer-readable storage medium of claim 17, wherein the network device is a donor device upstream from the wireless station.

* * * * *